US008567769B2

(12) United States Patent
Schneider

(10) Patent No.: US 8,567,769 B2
(45) Date of Patent: Oct. 29, 2013

(54) APPARATUS AND METHOD OF DISSOLVING A GAS INTO A LIQUID

(76) Inventor: Jakob H. Schneider, Calgary (CA)

(*) Notice: Subject to any disclaimer, the term of this patent is extended or adjusted under 35 U.S.C. 154(b) by 0 days.

(21) Appl. No.: 13/620,069

(22) Filed: Sep. 14, 2012

(65) Prior Publication Data

US 2013/0069253 A1    Mar. 21, 2013

Related U.S. Application Data

(62) Division of application No. 12/162,603, filed on Jul. 29, 2008, now Pat. No. 8,267,381.

(30) Foreign Application Priority Data

Jan. 31, 2006   (CA) .................................. 2534704
Jan. 31, 2007   (CA) ................. PCT/CA2007/000160

(51) Int. Cl.
  *B01F 1/00*   (2006.01)
(52) U.S. Cl.
  USPC .................... 261/122.1; 261/119.1; 261/124; 239/399; 239/403
(58) Field of Classification Search
  USPC ............. 261/119.1, 122.1, 124; 239/399, 403
  See application file for complete search history.

(56) References Cited

U.S. PATENT DOCUMENTS

| 4,215,081 | A  | 7/1980 | Brooks |
| 4,279,743 | A  | 7/1981 | Miller |
| 4,397,741 | A  | 8/1983 | Miller |
| 4,399,027 | A  | 8/1983 | Miller |
| 4,744,890 | A  | 5/1988 | Miller et al. |
| 4,838,434 | A  | 6/1989 | Miller et al. |
| 4,997,549 | A  | 3/1991 | Atwood |
| 5,049,320 | A  | 9/1991 | Wang et al. |
| 5,192,423 | A  | 3/1993 | Duczmal et al. |
| 5,529,701 | A  | 6/1996 | Grisham et al. |
| 5,531,904 | A  | 7/1996 | Grisham et al. |
| 6,106,711 | A  | 8/2000 | Morse et al. |
| 6,878,188 | B2 | 4/2005 | Yi |
| 6,918,949 | B1 | 7/2005 | Peters |
| 8,267,381 | B2 | 9/2012 | Schneider |

*Primary Examiner* — Christopher P Jones
(74) *Attorney, Agent, or Firm* — David B. Tingey; Kirton | McConkie

(57) ABSTRACT

Apparatus and process for dissolving gas in a liquid. The process comprises: tangentially introducing a liquid into a chamber having an inner wall with sufficient volume and pressure to develop a vortex in the flowing liquid; orthogonally introducing gas into the flowing liquid through means located at the chamber inner wall for developing gas bubbles within the liquid. The apparatus comprises: a cylindrical chamber having a cylindrical inner wall, the chamber being oriented in any direction enclosed at both ends and with an entry port to introduce liquid to develop a spiral flow of liquid along the chamber inner wall toward the output end, a porous wall to permit the introduction of gas orthogonally into the stream to develop gas bubbles within the stream, and an exit port to discharge the mixture of gas bubbles and liquid.

20 Claims, 3 Drawing Sheets

US 8,567,769 B2

APPARATUS AND METHOD OF DISSOLVING A GAS INTO A LIQUID

RELATED APPLICATIONS

This application is a divisional of U.S. patent application Ser. No. 12/162,603, now U.S. Pat. No. 8,267,381 B2, entitled "APPARATUS AND METHOD OF DISSOLVING A GAS INTO A LIQUID," filed Jul. 29, 2008, which claims priority to PCT/CA2007/000160 filed Jan. 31, 2007 and to Canadian Application No. 2534704 filed Jan. 31, 2006, all of which are hereby incorporated by reference in their entireties.

FIELD OF THE INVENTION

The present invention relates to process and apparatus for dissolving gas efficiently in the liquid phase by creating and maintaining conditions for maximizing the contact surface between gas and liquid in the form of gas bubbles.

BACKGROUND OF THE INVENTION

As readers skilled in the art will recognize, this invention has a wide range of application. The following example of aeration is for illustrative purposes only, and does not suggest that the invention is restricted to this application. Details of the separation vessel may vary; however, the essence of the invention and the underlying methodology remains constant: using turbulent circular flow inside the porous tube to sheer off small bubbles of gas to maximize contact surface and enhance the process of dissolving gas into a liquid.

Aeration plays important roles in many industries where process efficiency depends on a concentration of oxygen in the processed liquid; i.e. Brewing, Environmental services: waste water treatment, Farming and Fishery, or Mineral Processing.

Traditional methods of creating conditions for aeration include the use of simple aerated tanks, spray towers, bubble tray columns, and packed columns to create a gas-liquid interface. Traditional technology uses counter current, multiple stages for the gas to be absorbed. While these traditional methods and associated apparatus do achieve aeration, they are inefficient, requiring long processing times and hence large equipment volumes. The inefficiency associated with the traditional prior art approaches arises largely from the relatively low gas-liquid interfacial area to volumes provided by the equipment.

It has been suggested that improved aeration performance may be achieved through the use of an air-sparged hydrocyclone similar to designs used in the mineral processing industry for separation of solid particles from an aqueous suspension. Examples of particle separation methods and apparatus may be found in U.S. Pat. Nos. 4,279,743; 4,397,741; 4,399,027; 4,744,890; 4,838,434; and 4,997,549; 5,192,423. Each of these references is specifically based upon the concept of passing bubbles of air through a suspension of solid particles so that hydrophobic particles attach to air bubbles and form a cohesive froth that may be removed from the separation vessel. The apparatus design are concerned with the creation of gas-liquid contact conditions favorable for efficient particle to bubble interaction and separation with mass transfer.

In addition, various methods of and apparatus for removing volatile content (VCs) from water and other liquids have been known and used in the prior art for a number of years. One of the traditional approaches, generally referred to as "air stripping", removes VCs from a contaminated liquid by passing a stream of clean air or other gas through the water or other liquid so that VCs transfer from the liquid to the gas and may be removed from the system with the exiting gas. Examples of using swirling motion and a porous tube for such approach can be found in U.S. Pat. Nos. 5,529,701, 5,531,904 Grisham T. et al. The operating parameters of the method described by Grisham are selected to optimize the overall efficiency of both mass transfer between gas dissolved in the liquid phase and gas passing through the liquid. The flow rate of liquid in the Grisham method needs to be set to produce centrifugal force fields with radial accelerations between 400 Gs up to about 1500 Gs compared to accelerations of about 70 G used for particle separation.

In general, the method described by Grisham, dynamically mixes gas bubbles with liquid (thereby rapidly replenishing the supply of molecules of the transferring component in immediate proximity to the gas-liquid interface and minimizing mass diffusion limitations on transfer rate), optimizes the contact time between bubbles and liquid (thereby allowing material transfer to reach or closely approach equilibrium), and cleanly separates post-contact gas and liquid streams (thereby minimizing regressive transfer). The Grisham's objective is to maximize gas velocity flowing through the liquid and diverting both phases (liquid and gas) at the apparatus exit. If a large volume of gas passes through the unit of liquid then mass transfer of gas dissolved in liquid into passing gas is maximized increasing overall gas stripping efficiency. Grisham apparatus works in the regime of very high Gs promoting movement of gas from liquid to gas—but not in reverse.

It is generally assumed that diffusion of gas across an interfacial contact area is instantaneous, but the actual rate of transfer is subject to various limiting factors. In most cases the rate of gas diffusion into the liquid is always favored by maximizing the interfacial area relative to liquid and gas volumes, which means that the key is in generating very small diameter bubbles with narrow size distribution. When very small bubble size and narrow size distribution is achieved then a high gas to liquid volume ratio is achieved. The smaller the bubble, the bigger the gas volume that can be packed into the unit volume with a correspondingly larger surface area. The liquid occupies only voids between highly packed gas bubble spheres and a ratio of up to 50:1 gas to liquid can be achieved. The process of generating bubbles is dynamic and equilibrium must be achieved between creation of new bubbles and bubbles coalescing into bigger ones. The time of interaction must be maximized which puts limitations on the gas velocity.

Inventive discoveries related to the present invention include that—optimum bubble size distribution can be only achieved if a porous tubular housing with mean pores size—below 100 microns is used for the gas diffuser. It has also been discovered that optimum conditions exist for a given range of G forces and Reynolds number for turbulence of flow, which impart limitations on flow rates and the diameter of diffuser. High Reynolds numbers promote maintaining small bubble size and so prevent bubble coalescence by ripping apart all bubbles bigger than eddies in the flow. However, too high G force quickly moves bubbles to the centre due to the buoyancy of the bubbles. Once at the centre, the flow becomes coaxial with consequently drastically lower Reynolds number and bubbles coalescence that rapidly lowers interfacial contact surface area.

SUMMARY OF THE INVENTION

Creating conditions where enhanced gas diffusion into the liquid can be achieved and maintained in a practical manner is the objective of the present invention.

The present invention provides a method of enhanced dissolving of gas into the liquid stream. The present invention takes into account the significant differences between the physical mechanisms involved in the three processes of the separation of particles from aqueous slurry, the extraction of chemical contaminants from a liquid stream, and dissolving gas into a liquid phase. Although all three processes may utilize swirling flow and gas permeating through a porous tube, the fundamental difference is in the direction of the mass transfer, values of a centrifugal field and relative flow ratios. In mineral processing, the objective is to move solids from liquid phase to froth phase where bubbles are the carrier. In gas stripping, the objective is to transfer gas dissolved in liquid phase into the passing gas shaped as bubbles, which should be moved as quickly as possible through the liquid phase.

The present invention creates enhanced conditions for dissolving gas into the liquid phase, including bubble size, and bubble size distribution and duration of interaction with liquid which play a significant role in overall performance of gas diffusion into liquid.

The present invention addresses these requirements by combining several elements:
  high turbulence swirling flow of liquid;
  orthogonal flow of liquid and gas;
  constant pressure inside the vessel;
  optimum flow velocity generating centrifugal forces within the 100 to 300 Gs thereby extending diffusion rate within the vessel of apparatus; and
  very small pores, through which gas permeates into in the liquid and is sheered off into liquid phase thereby forming small bubbles.

Moreover, in contrast to prior art vessels; the pressure inside the present invention's vessel can be constant when the vessel is substantially enclosed even with entry and exit ports. The bubbles, as they travel along the vessel, do not expand due to a pressure drop, and with increasing velocity along the interior wall of the vessel, the turbulence increases, further preventing bubble coalescence.

The above combination of design and operational elements creates an environment for enhanced efficient process of gas diffusion into liquid.

According to an aspect of the present invention, a process consists of the following steps:
  i) introducing a stream of liquid into a cylindrical chamber having a cylindrical inner wall, the chamber being oriented in any direction and enclosed at both ends, the stream being introduced near a first, or input, end, of the chamber in a manner to develop a spiral flow of liquid along the chamber inner wall toward the second, or output, end,
  ii) introducing gas into the stream during at least a portion of the stream's travel, the gas being introduced to the stream orthogonally through means located at the chamber inner wall for developing gas bubbles which move into the stream, so the swirling stream resides in the chamber for sufficient time to permit a diffusion of gas into the liquid stream,
  iii) introducing the stream in sufficient volume and pressure to develop a vortex in the liquid which extends along the chamber, and
  iv) allowing the swirling mixture of liquid and gas to exit the vessel at the output end.

According to another aspect of the present invention, an apparatus consists of:
  i) a cylindrical chamber having a cylindrical inner wall, the chamber being oriented in any direction and enclosed at both ends,
  ii) an entry port near a first, or input, end of the chamber to permit introduction of a stream of liquid into the chamber in a manner to develop a spiral flow of the liquid along the chamber inner wall toward the second, or output, end; and such entry port in the form of a tangential header allowing the introduction of the stream in sufficient volume and pressure to develop a vortex in the liquid which extends along the chamber,
  iii) a gas entry port, that allows gas to be introduced orthogonally to the stream through means located at the chamber inner wall for developing gas bubbles which move into the stream,
  iv) the chamber being of a length sufficient to provide residence time in the chamber to permit a diffusion of gas,
  v) an exit port allowing the swirling mixture of liquid and gas to exit the vessel, at the output end, and
  vi) a system of valves and actuators which stops the flow of the liquid in case of a gas pressure drop to stop the flow of liquid into the chamber in order to prevent liquid from permeating through a porous tube.

BRIEF DESCRIPTION OF THE DRAWINGS

The present invention may be further understood by reference to the description of the invention, taken in conjunction with the accompanying drawings, in which.

DETAILED DESCRIPTION OF A PREFERRED EMBODIMENT

Figure 1:
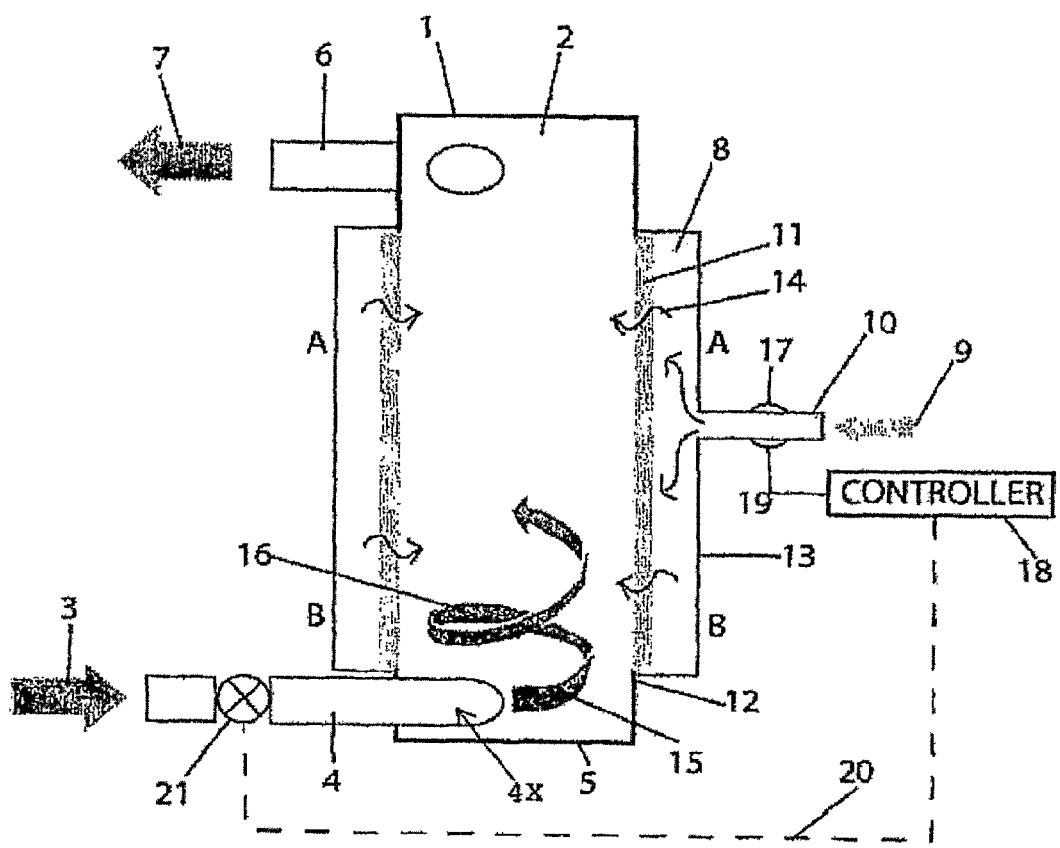
FIG. 1 is a perspective view of the apparatus for dissolving gas in a liquid.

In the description that follows, like parts are marked throughout the specification and the drawings with the same respective reference numerals.

With particular reference to FIG. 1, a preferred embodiment and its operation are described. Apparatus 1 comprises a cylindrical chamber 2, which when in use can be inclined although the cylindrical chamber can be oriented in any direction. The liquid to be introduced into the apparatus 1 is directed in the direction of arrow 3 through conduit 4 and into chamber 2 via entry port 4x that is positioned tangentially relative to chamber 2 forming a liquid stream 15. The lower end 5 of chamber 2 is closed so that liquid stream 15 flows in the direction of arrow 7 toward exit port 6 located at the output end, which exit port 6 in turn can be oriented or of such size and shape as to discharge liquid stream 15 along various angles outside chamber 2 such as directly or tangentially as shown.

As liquid stream 15 progresses along the inner surface of chamber 2, gas is introduced orthogonally into the liquid through porous wall 11.

Located circumferentially of the cylindrical chamber 2 is a plenum 8. Pressurized gas is introduced into plenum 8 in the direction of arrow 9 through inlet 10. Pressurized gas enters chamber 2 through porous wall 11 to develop gas bubbles within the liquid as it flows along the inner surface 12 of chamber 2.

It is appreciated that a variety of gas introduction mechanisms may be provided to communicate with the inner surface of the cylindrical chamber. For purposes of description and illustration of the particular embodiment of FIG. 1, plenum 8 envelops a porous wall 11. Plenum 8 is defined by an outer shell 13, which encloses the hollow cylinder of porous wall 11. Porous wall 11 is flush with inner surface 12 to define a continuing inner surface. Gas is introduced through tube 10 and pressurizes the interior of plenum 8 whereby gas then permeates through the porous wall 11 to develop gas bubbles within liquid stream 15. Sufficient pressure is developed in plenum 8 to cause the gas within to diffuse through porous wall 11 in the direction of arrows 14 circumferentially of chamber 2 to thereby orthogonally introduce gas into flowing liquid stream 15.

Constant pressure can be maintained within chamber 2 when it is substantially enclosed even with entry port 4x and exit port 6.

In an alternate embodiment, a liquid stream can be introduced through an entry port in sufficient volume and at sufficient velocity to develop a vortex, generally designated 16.

In an alternate embodiment, liquid stream 15 can be introduced with optimum flow velocity to generate centrifugal forces of the vortex 16 within the range of 100 to 300 Gs to extend the diffusion rate within chamber 2 of apparatus 1.

As is appreciated by those skilled in the art, the pressure of gas in plenum 8 may be sensed by sensor 17. Sensor 17 can provide output, which is connected to controller 18 via input line 19. Controller 18 has output via line 20 to servo control valve 21. By standard feedback techniques controller 18 opens and closes valve 21 in case of pressure drop so as to stop the flow of liquid into the chamber in order to prevent the liquid from permeating through the porous wall 11 into plenum 8.

As liquid stream 15 flows along inner wall 12 of chamber 2, more and more gas bubbles are introduced into liquid stream 15 and the gas displaces more liquid. The ratio of the flow rates of liquid and gas into chamber 2, the length of the porous wall, and its permeability can be kept in balance by constant pressure within chamber 2 such that when the mixture of gas bubbles and liquid developed within liquid stream 15 reaches exit port 6 of chamber 2, the mixture of liquid stream 15 has a flow characteristic of liquid and not froth. The exit velocity of liquid stream 15 is significantly higher than the velocity of the liquid entering chamber 2.

Figure 2:
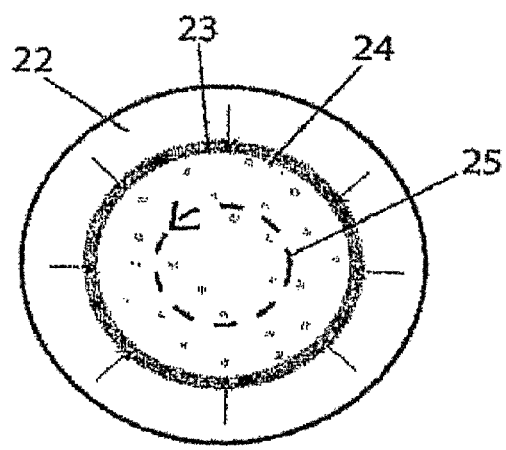
FIG. 2 is a section along the lines AA of the chamber for introducing gas bubbles into the swirling slurry in apparatus of FIG. 1.

With reference to FIG. 2, the development and incorporation or inclusion of gas bubbles in the liquid stream according to the aforesaid embodiments is described. In operation, pressurized gas in plenum 22 permeates through fine mesh 23 to develop at the mesh inner surface minute bubbles 24. The previously introduced liquid stream develops a thickness 25 circumferentially around the inner wall of the chamber as the liquid stream flows along inner wall of mesh 23. The vortex of the liquid stream extends centrally of the cylindrical chamber along the longitudinal axis of the chamber. Gas is introduced through fine mesh 23, encounters the liquid stream orthogonally, and is sheared into numerous bubbles by the high velocity swirl of the liquid imparted by the vortex. The bubble generation mechanism accomplished with fine mesh 23 is a two-stage process. First, gas migrates through the micro channels of the fine mesh, or porous wall. When leaving the pore, gas creates a small cavity. The cavity grows until the gas encounters the liquid stream orthogonally and the shearing force of the flowing liquid is greater than the cavity's surface tension holding it at the pore. In the second stage, once a bubble is sheared off from the surface of the fine mesh, or porous wall, it begins to flow, and then flows, with the liquid as the liquid is carried by turbulent flow. Fine mesh 23, which constitutes the porous portion of the chamber wall, may be constructed of a variety of known materials. The fine mesh, or porous wall may be a screen product having rigidity and which defines a reasonably smooth surface to maintain swirling flow of the liquid. A variety of screen meshes are available which will provide such porosity. Other materials include sintered porous materials of metal oxides that have the necessary structural strength yet provide a relatively smooth surface. It is appreciated that other forms of porous materials are available such as sintered, porous, stainless steel of controlled porosity, for example, stainless steel of grade/type 316LSS.

In an alternate embodiment, the mean pore size of the fine mesh or porous wall is no greater than 100 microns.

Figure 3:
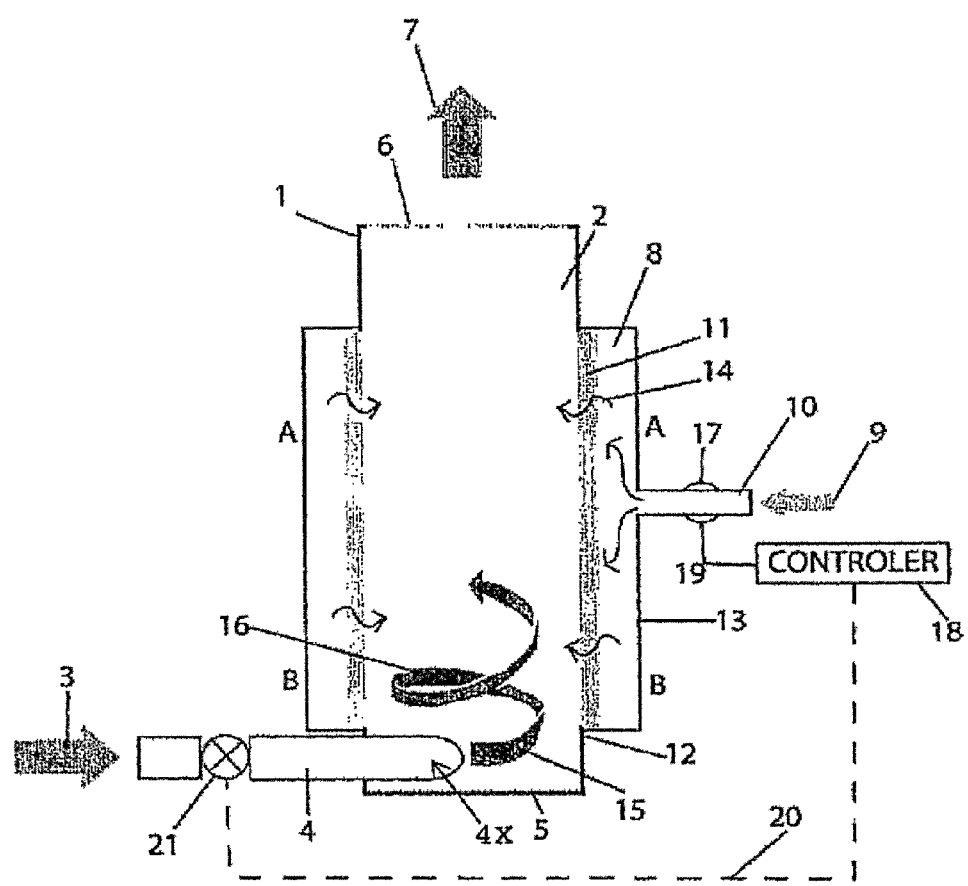
FIG. 3 is a perspective view of the apparatus of FIG. 1 with an alternate exit port 6.

With reference to FIG. 3, in an alternate embodiment, exit port 6 can be of such size and shape as to discharge liquid stream 15 directly outside chamber 2 as effectively as if the output end of the chamber were open.

Example

The apparatus was used to aerate a fishpond at Tim Layton's Pond at Rimbey, Alberta, Canada for 94 hours. It pumped approximately 850 cubic meters with 1:3 water to air ratio. The measurements of the dissolved oxygen were taken every 8 hours. The initial 2.76 ppm (mg/l) DO (dissolved oxygen) raised linearly to 6.62 ppm (mg/l) DO.

The foregoing description, and the embodiments described therein, are provided by way of illustration of an example, or examples of particular embodiments of principles and aspects of the present invention. These examples are provided for the purposes of explanation, and not of limitation, of those principles and of the invention.

Although the above description and accompanying drawings relate to specific preferred embodiments of the present invention as presently contemplated by the inventor, it will be understood that various changes, modifications and adaptations may be made without departing from the spirit of the invention.

What is claimed is:

1. An apparatus for diffusing gas bubbles in a liquid, said apparatus comprising:
   i) a vessel comprising a cylindrical tube defining an interior cylindrical chamber having a cylindrical inner wall, wherein said cylindrical tube further comprises enclosed ends,
   ii) means for introducing a stream of liquid tangentially of said inner wall, said liquid introducing means being positioned in a input zone of said chamber to direct said liquid stream in a manner, to develop a spiral flow of said liquid stream along said inner wall toward an opposite end of said interior chamber,
   iii) said inner wall having along at least a portion thereof and extending there around, means for introducing gas into said interior chamber as said liquid stream passes over said gas introducing means, orthogonally, and
   iv) an exit port, wherein the apparatus is configured to control a flow of liquid and gas bubbles so that a ratio of liquid flow rate to gas bubble flow rate does not exceed values which convert liquid into froth, and wherein said apparatus is configured to discharge a stream of a mixture of liquid and gas bubbles from said exit port.

2. An apparatus according to claim 1, wherein said liquid introducing means allows introduction of said liquid stream in sufficient volume and pressure to develop a vortex in said liquid stream extending along said inner wall.

3. An apparatus according to claim 2, wherein said liquid introducing means controls a velocity of said liquid stream to generate centrifugal forces for said vortex to within a range of 100 to 300 Gs within said vessel.

4. An apparatus according to claim 1, wherein said gas introducing means comprises a material having a porosity with a mean pore size of no greater than 100 microns.

5. The apparatus of claim 1, wherein the exit port is configured to discharge the stream of the mixture of liquid and gas bubbles tangentially from the vessel.

6. The apparatus of claim 1, further comprising an input valve and a controller, wherein the controller is configured to open and close the input valve and thereby control a flow of the liquid stream into the interior chamber.

7. The apparatus of claim 1, wherein the apparatus is configured to discharge the stream of the mixture of liquid and gas bubbles from the exit port when the apparatus is in any and all orientations.

8. An apparatus for diffusing gas bubbles in a liquid, said apparatus comprising:
   i) a vessel comprising a cylindrical tube defining an interior cylindrical chamber having a cylindrical inner wall and an enclosed end,
   ii) means for introducing a stream of liquid tangentially of said inner wall, said liquid introducing means being positioned in a input zone of said chamber to direct said liquid stream in a manner, to develop a spiral flow of said liquid stream along said inner wall toward an opposite end of said interior chamber,
   iii) said inner wall having along at least a portion thereof and extending there around, means for introducing gas into said inner chamber, orthogonally, as said liquid stream passes over said gas introducing means, and
   iv) an exit port, wherein the apparatus is configured to control a flow of liquid and gas bubbles so that a ratio of liquid flow rate to gas bubble flow rate does not exceed values which convert liquid into froth, and wherein said apparatus is configured to discharge a stream of a mixture of liquid and gas bubbles from said exit port, said discharge means comprising an open end of said interior chamber.

9. An apparatus according to claim 8, wherein said liquid introducing means allows introduction of said liquid stream in sufficient volume and pressure to develop a vortex in said liquid stream extending along said inner wall.

10. An apparatus according to claim 9, wherein said liquid introducing means controls the velocity of said liquid stream to generate centrifugal forces for said vortex to within a range of 100 to 300 Gs within said vessel.

11. An apparatus according to claim 8, wherein said gas introducing means comprises a material having a porosity with a mean pore size of no greater than 100 microns.

12. The apparatus of claim 8, further comprising a plenum disposed circumferentially about a portion of the interior chamber to supply the gas to the gas introducing means.

13. An apparatus for diffusing gas bubbles in a liquid, the apparatus comprising:
   a vessel comprising a cylindrical tube defining an interior cylindrical chamber having a cylindrical inner wall and an enclosed end;
   an entry port to the interior chamber, wherein the entry port is positioned tangentially relative to the interior chamber to direct a stream of liquid to form a spiral flow along, and within, the inner wall, wherein the inner wall comprises a porous portion configured to direct gas bubbles through the inner wall and into the stream of liquid; and
   an exit port, wherein the apparatus is configured to control a flow of liquid and gas bubbles so that a ratio of liquid flow rate to gas bubble flow rate does not exceed values which convert liquid into froth, and wherein the apparatus is configured to discharge a stream of a mixture of liquid and gas bubbles from the exit port.

14. The apparatus of claim 13, wherein the apparatus is configured to control a velocity of the liquid stream to generate centrifugal forces within a range of 100 to 300 Gs within said vessel.

15. The apparatus of claim 13, wherein the exit port is configured to discharge the stream of the mixture of liquid and gas bubbles tangentially from the vessel.

16. The apparatus of claim 13, wherein the exit port comprises an opening at an end of the interior chamber that discharges the stream of the mixture of liquid and gas bubbles directly from the vessel.

17. The apparatus of claim 13, further comprising a plenum disposed circumferentially about a portion of the interior chamber to supply the gas to the porous portion of the inner wall.

18. The apparatus of claim 13, wherein the interior chamber comprises a length that is sufficient to provide a resistance time in the interior chamber to permit diffusion of the gas into the liquid.

19. The apparatus of claim 13, wherein the porous portion of the inner wall is flush with an inner surface of the inner wall.

20. The apparatus of claim 13, wherein the apparatus is configured to maintain a constant pressure within the vessel as the apparatus functions.

* * * * *